United States Patent [19]
Herrera

[11] 3,909,857
[45] Oct. 7, 1975

[54] DAMPED ARTICULATION DEVICE FOR SWIVEL-MOUNTED FURNITURE

[76] Inventor: Jose Pardo Herrera, Carretera de Logrono, Km. 1, 7, Zaragoza, Spain

[22] Filed: Aug. 5, 1974

[21] Appl. No.: 494,995

[30] Foreign Application Priority Data
Jan. 15, 1974 Spain .................................. 199516

[52] U.S. Cl. .................................. 5/164 R; 5/10 R
[51] Int. Cl.² .......................................... A47C 19/00
[58] Field of Search ......... 5/10 R, 61, 63, 133, 136, 5/164, 168, 174

[56] References Cited
UNITED STATES PATENTS
| | | | |
|---|---|---|---|
| 1,113,996 | 10/1914 | Hunter | 5/133 |
| 1,273,978 | 7/1918 | Young et al. | 5/136 |
| 3,828,375 | 8/1974 | Driver | 5/136 |

*Primary Examiner*—Casmir A. Nunberg
*Attorney, Agent, or Firm*—Ostrolenk, Faber, Gerb & Soffen

[57] ABSTRACT

A damping means for swivelable furniture comprising a piston in cylinder arrangement which with other elements damps the swiveling.

5 Claims, 3 Drawing Figures

DAMPED ARTICULATION DEVICE FOR SWIVEL-MOUNTED FURNITURE

The invention concerns a damped articulation device for swivel-mounted furniture.

The invention is used in a swivel-mounted device, and is especially designed for beds or it fits into furniture or recesses formed in surfaces. In the device, a damping system has been incorporated allowing the balancing and absorption of the weight of the piece of furniture in any position between the extremes of closure and extension, in order to provide a smooth movement, with no need to apply force when pulling or pushing.

The invention is based on the incorporation of one or more damping elements, (preferably of the telescopic kind), of the hydraulic or the pneumatic variety, and also of the spring variety. The clamping elements work to oppose the action of gravity on the piece of furniture. The said damping elements are arranged underneath the spring bed. The damping element is articulated at one end to the longitudinal or cross beams of the spring bed, whilst at the other end it is fixed, also by articulation on some points of anchorage independent from the spring bed, like the sides or base of the furniture or recess. At the artibulation points are provided pivoting means for support of the spring bed or other furniture.

It is necessary to repeat that the said dampers can be provided in various quantities, it being possible to provide only one. The number of damping elements selected depends upon the strength of the connection and the stress to be exerted upon it. Most arrangements use two dampers.

It is also convenient to point out that the articulation device disclosed herein can be applied to other types of of so-called adaptable furniture, as well as to swivel-mounted panels of any kind.

In order to make the invention clearer, drawings are annexed, providing a simple introduction and without limitation.

Figure 1:
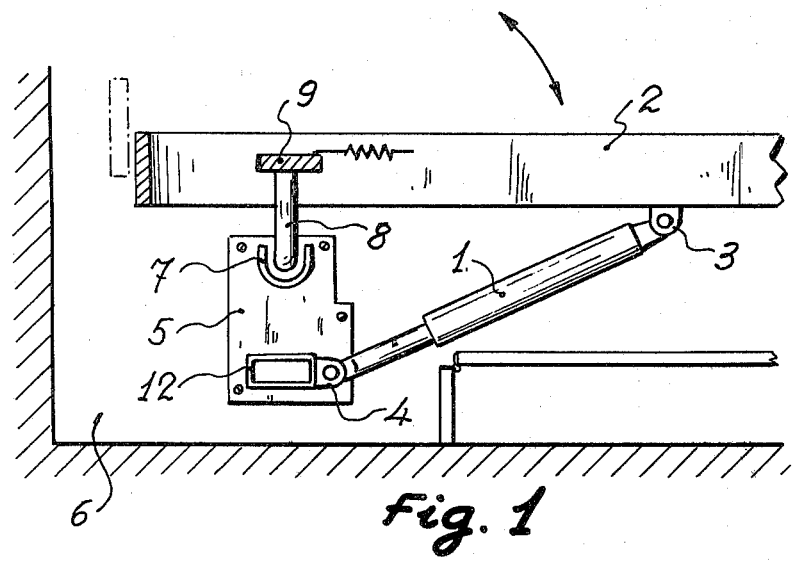
FIG. 1, shows a cross sectioned elevation view along the line of and in the direction of arrows I in FIG. 2 according to of a fragment of the frame of an extended spring bed that is equipped with the invention.

In the drawings, the device of the invention comprises one or more dampers -1- each comprised of a telescopable daming cylinder and telescopable, extensible rod projecting therefrom. Preferably two dampers are used, arranged at both sides of a spring bed and under the respective longitudinal beams -2- of the bed in the area next to the pivoting end of the spring bed, normally the head. The dampers -1- are articulated and connected at one of their ends on lugs -3- positioned under the respective longitudinal beams -2-. The other end of each of the damping cylinders -1-, i.e. is extensible rod, is fixed, also by articulation, between two forks -4- that are attached through below described trunnion 12 to a respective anchoring plate -5-. Each plate 5 is fixed on the side of the piece of furniture, of the frame or of the recess -6-, as is shown in FIGS. 1 and 2.

Figure 2:
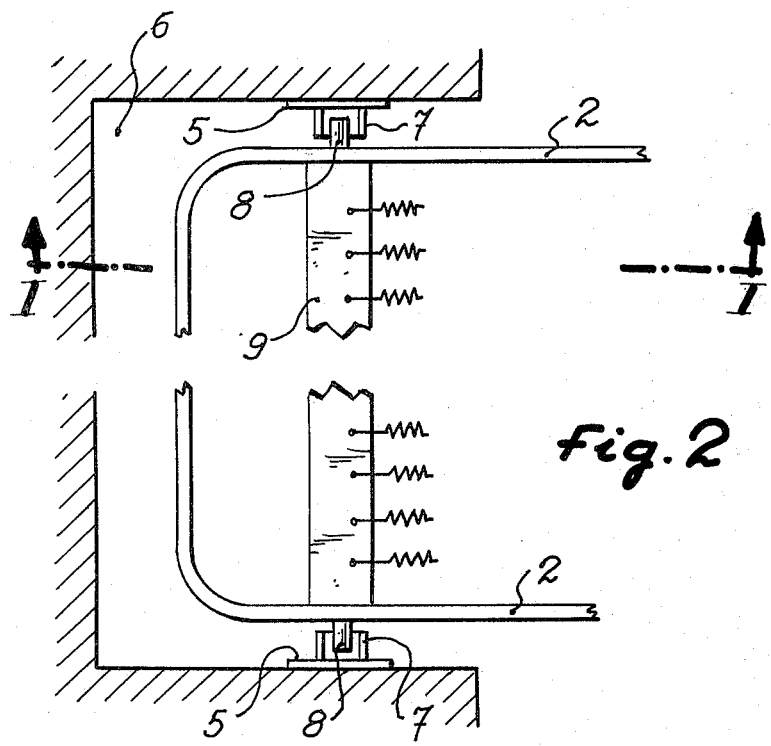
FIG. 2 is a plan view of the frame of FIG. 1.

The anchoring plates -5- are situated nearer the head of the spring bed in such a way that the damping cylinders -1- adopt the inclined position of FIG. 1, the situation of the extendable rods of the same being unimportant. The spring bed beams -2- pivot on the anchoring plates -5- in a manner described below and in such a way that when correctly placed, the dampers -1- facilitate the tilting movements of the spring bed -2- balancing the weight of the same, in such a way that these movements are carried out perfectly smoothly and with barely any effort.

Figure 3:
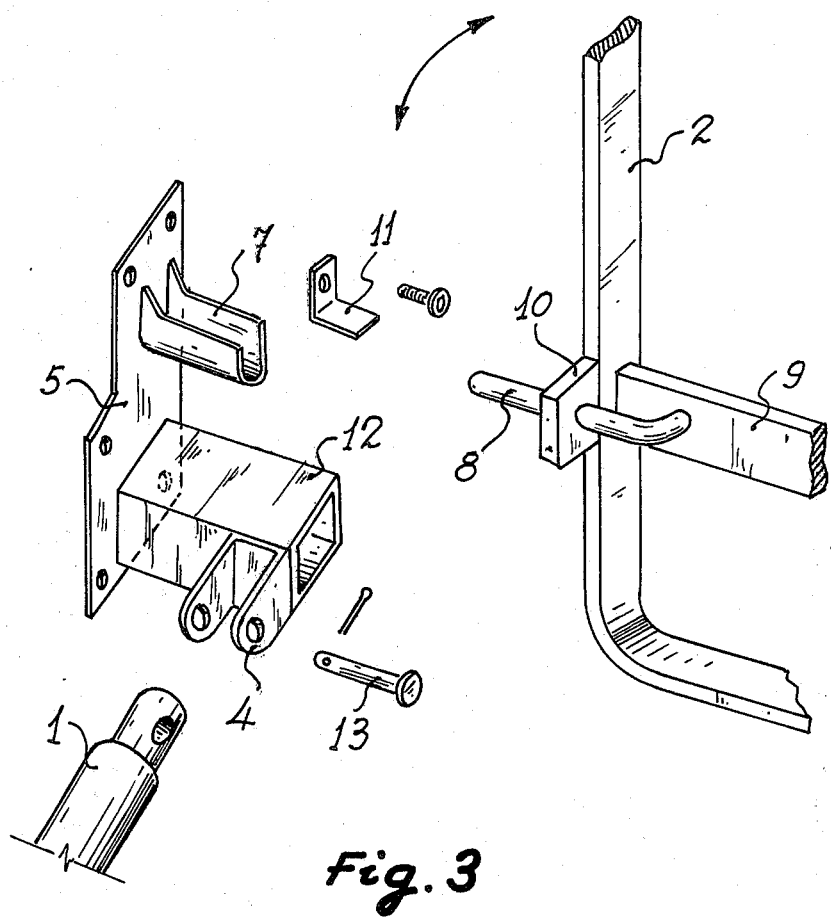
FIG. 3 is an exploded perspective view of the means for securing the frame of the bed and in which the spring bed is shown in the raised position.

In FIG. 3 details of an anchoring plate -5- are shown. It consists of an upper bush -7- which is perpendicular to plate 5, preferably semicylindrical in cross section, although it could be completely cylindrical Bush 7 serves as a support for the end of a rod -8- that is suitably attached to the beam -2- i.e. by being attached to a cross beam -9-. Rod 8 has an elbowed fold just before it reaches side beam 9. Rod 8 is also reinforced by means of a block -10- which serves at the same time as a central stopper of the rod support -8-. Rod 8 is suitably strong to serve as the tilt shaft of the spring bed. This assembly is finally secured with an angular bush -11- attached by one of its wings to the plate -5-, in such a way that the other wing of bush 11 covers the tilt shaft -8-, making it impossible that this can be accidentally dismounted. There are two anchoring plates -5- one at each side of the spring bed and the associated elements shown in FIG. 3. The spring bed is tiltable on the said rod -8-, formed by the fixed shaft made solid at its ends to the corresponding bushes -7- by means of crossbars.

At the lower part of each anchoring plate -5- is solidly attached a trunnion -12-, which forms a right angle with plate 5. At the free end of the trunnion are the suitably oriented two lugs which are adapted to form the fork -4- which receive the corresponding end of the cylinder in order to be fixed in an articulation manner by means of a pin -13- suitably retained in position through openings in forks 4 and cylinder 1.

The trunnion -12- can be replaced by a cylindrical stud welded perpendicularly to the anchoring plate -5-. The stud would be sized so that it penetrates the opening through the corresponding end of the cylinder -1-. The said stud would serve as the tilt shaft of the said cylinder 1.

Having sufficiently described the nature of the invention as well as a practical example of implementation of the same, it merely remains to add that changes of materials, forms and arrangements of its parts can be introduced.

We claim:

1. A damped articulation device for swivel mounted furniture, or the like, wherein the furniture includes a beam, or the like, which is to be pivoted between a generally more horizontal and a generally more vertical orientation, said articulation device comprising:

an anchoring means; articulation support lugs carried by said anchoring means;

a telescopable damping cylinder and telescopable extensible damping rod assembly with said rod extending from and telescoping into said cylinder; said assembly being provided to serve as a balancing means for the weight of the furniture, or the like; one end of said assembly being articulatedly connected at a location along said beam, such that said assembly might articulate with respect to said beam as said beam is pivoted; the opposite end of said assembly being articulatedly connected to said articulation support lugs such that said assembly might articulate with respect to said lugs as said beam is pivoted;

beam pivot means spaced from said ends of said assembly and pivotally supporting said beam to pivot about an axis; said assembly extending in a direction across the direction of said axis.

2. The damped articulation device of claim 1, wherein said beam pivot means comprises:

a pivot support attached to said beam;

a bush on said anchoring means and facing toward said beam for receiving said pivot support and for enabling pivoting of said pivot support in said bush upon pivoting of said beam.

3. The damped articulation device of claim 2, wherein said anchoring means comprises an anchoring plate carrying said bush and said articulation support lugs;

a trunnion carried on said anchoring plate and said articulation support lugs being carried on said trunnion.

4. The damped articulation device of claim 2, wherein said pivot support comprises a rod projecting from said beam toward said bush; an elbow in said rod between said bush and said beam, whereby upon pivoting of said beam about said rod, said beam is also swung about said bush.

5. The damped articulation device of claim 3, wherein said pivot support comprises a rod projecting from said beam toward said bush;

said bush comprising a projection from said anchoring plate; said bush being shaped in cross-section as part of a cylinder; said projection having an open side of a size such that said rod could move in and out of said bush through its said open side; said bush open side normally facing upwardly such that said rod would have to be lifted from said bush;

a locking element secured to said anchoring plate and spaced from said bush and from said rod and extending over said bush open side, thereby to block undesired exit of said rod from said bush.

* * * * *